United States Patent Office 3,122,566
Patented Feb. 25, 1964

3,122,566
OXIDATION OF ACROLEIN DIMER
Oscar L. Norman, Northbrook, Ill., assignor to International Minerals & Chemical Corporation, a corporation of New York
No Drawing. Filed Aug. 21, 1958, Ser. No. 756,303
5 Claims. (Cl. 260—345.7)

The present invention relates to the selective oxidation of acrolein dimer. More particularly, it relates to the conversion of acrolein dimer into 3,4-dihydro-1,2-pyran-2-carboxylic acid.

Acrolein dimer is a heterocyclic aldehyde which can be more explicitly designated as 2-formyl-3,4-dihydro-1,2-pyran. This material has been converted into the corresponding carboxylic acid, 3,4-dihydro-1,2-pyran-2-carboxylic acid, by oxidation with silver oxide or by reaction with aluminum isopropoxide, as described by Whetstone in U.S. Patent 2,562,848 (July 31, 1951). These techniques, involving the use of stoichiometric proportions of expensive reagents and the production of large quantities of undesired by-products, are uneconomical, and a need has existed for a more practicable process for the said oxidation.

An object of the present invention is to subject acrolein dimer to selective oxidation in a practicable and economical manner.

Another object is to improve the conversion of acrolein dimer to sodium 3,4-dihydro-1,2-pyran-2-carboxylate.

Other objects of the invention will be apparent from the present description thereof.

It has now been discovered that acrolein dimer can be oxidized economically and in high yield by treatment with an oxygen-containing gas in the presence of a catalyst comprising a base metal oxide admixed with a small proportion of a noble metal oxide. Suitable noble metal oxides include the oxides of silver, gold, platinum, and palladium. Suitable base metal oxides include the oxides of iron, copper, and titanium. A particularly preferred catalyst comprises between about 1 and about 5% by weight of silver oxide supported on ferric oxide ($Fe_2O_3$).

In one method for carrying out the oxidation involved in the present invention, a suitable catalyst is prepared and suspended in water; and air, oxygen, or other oxygen-containing gas is bubbled through the water, preferably in finely divided condition. To the resulting slurry of catalyst and air is added acrolein dimer, either continuously or incrementally, and simultaneously a solution of an alkali-metal hydroxide, an alkaline-earth metal hydroxide, or other base or alkaline material is added to maintain the pH on the alkaline side, preferably between 7 and 9. The temperature of the reaction mixture is maintained below the level at which the acrolein dimer undergoes further polymerization under the existing conditions, ordinarily not above about 100° C., and preferably at or around ordinary temperatures between about 10 and about 40° C. The pressure may be atmospheric or superatmospheric. After the desired quantity of acrolein dimer has been added, the treatment with oxygen is continued until the pH remains constant (i.e., until there is no further production of acid). The reaction product mixture is then preferably filtered to remove the catalyst and any other solid material, and the liquid is preferably distilled at least to some extent in order to drive off any unreacted acrolein dimer and other volatile materials. The remaining solution contains largely the desired 3,4-dihydro-1,2-pyran-2-carboxylic acid in the form of its salt, which can be recovered as such in essentially pure form by concentration and crystallization. Alternatively, the solution can be acidified with hydrochloric acid, sulfuric acid, or the like, and the 3,4-dihydro-1,2-pyran-2-carboxylic acid can be recovered in a known manner. As a further alternative, the solution can be used as such where the dissolved salt can be used in the presence of water.

The product solution can, for example, be subjected to ozonization, with or without prior acidification, and the ozonide solution can be subjected to cleavage and non-destriuctive oxidation to produce alpha-hydroxyglutaric acid and the lactone thereof, as described in the copending application of Rudolph Kodras, Serial No. 756,281, filed August 21, 1958, now Patent No. 2,904,555. The product thus obtained can be subjected to reaction with ammonia at 250–350° C. in a pressure vessel, then hydrolyzed under acidic or alkaline conditions to produce glutamic acid.

In a batch process as described above, the reaction mixture tends to foam excessively if the proportion of acrolein dimer added thereto exceeds about 5% by weight of the medium. The quantity of acrolein is for this reason preferably limited to about 3 to about 5% of the weight of the medium. The tendency toward foaming is aggravated at increasing proportions of catalyst. It is accordingly preferred to limit the proportion of catalyst to around 0.5 to 5% by weight of the reaction medium. Such proportions of catalyst are sufficient to effect rapid and complete oxidation of the acrolein dimer, and can be recovered and recycled. In a catalyst recycle process, it is advantageous to add a make-up quantity of the noble metal oxide to the catalyst from time to time and optionally to treat the catalyst with a solvent such as ethyl ether, dimethylformamide, dioxane, tetrahydrofurfuryl alcohol, or the like to remove organic degradation products.

It will be apparent that the oxidation can be carried out by alternative procedures, representing variations of the procedure described above. It is feasible, for example, to carry out the oxidation in a column packed with pellets of the catalyst. In such case, the reaction medium can be trickled downward as a falling film over the catalyst, with the stream of air or oxygen flowing in either direction. Alterantively, the catalyst bed can be flooded, and the liquid phase can be made to flow in either direction through the column, while the stream of air or oxygen preferably flows upward. In another modification, the oxidation is carried out in a body of catalyst slurry, with more or less continuous addition of acrolein dimer and more or less continuous withdrawal of reaction product, suitably through filtering means to avoid loss of catalyst. Other variations will be readily apparent.

The catalyst preparation is conveniently carried out by dissolving appropriate salts of the base and noble metals in water, precipitating the metals in the form of the hydroxides, carbonates, basic carbonates, or other derivatives readily convertible to the oxides, washing free of soluble materials, then calcining or otherwise treating as required to produce the desired oxide mixture. In another method, the base metal oxide is impregnated with a solution of a suitable salt of the noble metal, and the impregnated oxide is treated as necessary to produce the noble metal oxide. Numerous other preparation techniques are described in the art.

The proportion of noble metal oxide in the catalyst is not critical, and may ordinarily range from about 1% by weight up to about 15% by weight or more. For most effective and economical utilization of the noble metal, the proportion of noble metal oxide in the catalyst should range between about 1 and about 5% by weight.

The invention will be more readily understood from the following specific examples.

*Example 1*

An oxidation catalyst was prepared according to the following procedure. Iron oxide (106.2 grams) was suspended in 1665 milliliters of distilled water. To the suspension were added 3.3 grams of solid sodium hydroxide, followed by a solution of 1.66 grams of silver nitrate in 66 milliliters of distilled water. The resulting precipitate was allowed to settle out, the liquid phase was decanted, and the solids were washed twice by decantation with 1665-milliliter portions of distilled water. The final wash water was neutral.

The washed catalyst was resuspended in 1665 milliliters of distilled water in a 2-liter beaker equipped with a thermometer, a mechanical stirrer, two coarse gas dispersion tubes, a dropping funnel, a capillary tube extending nearly to the bottom of the beaker, and two electrodes for pH measurement. The electrodes were connected to a Beckman automatic titrimeter, which was set up to dispense an aqueous sodium hydroxide solution of approximately 20% concentration into the beaker at a point near one of the gas dispersion tubes. Oxygen was metered from a cylinder into the gas dispersion tubes at the rate of about 100 liters per hour, while acrolein dimer was added dropwise. As the oxidation proceeded, sodium hydroxide solution was added by the titrimeter to maintain the pH of the mixture slightly on the alkaline side (about pH 7.2). In order to calibrate the action of the titrimeter, the pH of the reaction mixture was checked periodically with pH paper, and it was determined that an apparent pH setting of 11.2 to 11.6 was required on the automatic titrimeter to maintain the desired pH level, apparently owing to the fact that the electrodes became coated with iron oxide. A total of 39 milliliters (42 grams, 0.376 mole) of acrolein dimer was added. The oxygen treatment was continued until no further change in pH took place (i.e., until the addition of sodium hydroxide solution by the automatic titrimeter ceased). A total reaction time of 3.33 hours was required, and approximately the theoretical amount of sodium hydroxide was added by the titrimeter.

The completed reaction product was filtered, then refiltered through a layer of filter aid, and adjusted to pH 7 with hydrochloric acid. Chromatographic analysis of the solution with BuOH–AcOH–$H_2O$ (4:1:1, volume basis) gave a single spot at the known position for sodium 3,4-dihydro-1,2-pyran-2-carboxylate.

*Example 2*

An oxidation catalyst was prepared according to the method described in Example 1, employing 26 grams of iron oxide, 400 milliliters of distilled water, 0.8 gram of solid sodium hydroxide, and a solution of 0.4 gram of silver nitrate dissolved in 2.0 milliliters of distilled water.

The washed catalyst was suspended in 1400 milliliters of distilled water, and 56 grams (0.5 mole) of acrolein dimer were added dropwise thereto over a period of 4.5 hours. At the same time, oxygen was bubbled through the liquid at the rate of about 100 liters per hour, and aqueous 16.8% sodium hydroxide solution was added by the automatic titrimeter to maintain the pH of the solution slightly on the alkaline side. The reaction mixture was maintained at about 25° C. by cooling in a water bath. A total of 88 milliliters of sodium hydroxide solution was used, weighing 104 grams, equivalent to 87.5% of the theoretrically required amount. The reaction product, having a pH of 7.3, was filtered, then evaporated to 500 milliliters, weighing 522.5 grams and having an approximate density of 1.042. The solute was essentially sodium 3,4-dihydro-1,2-pyran-2-carboxylate.

A 50-milliliter portion of the product solution was subjected to ozonization at 20° C. with a stream of oxygen containing between 3 and 4% ozone. Approximately 65 minutes were required to complete the ozonization. The quantity of ozone absorbed corresponded to 71.4% of the theoretical quantity, based upon the original acrolin dimer.

The ozonized material was commingled with 1.5 milliliters of 95% sulfuric acid and 3 milliliters of 50% hydrogen peroxide, then refluxed for 7 to 8 hours until a potassium iodide test for active oxygen was negative. Concentrated aqueous ammonia (2 milliliters) was then added to neutralize the acid, and the solution was evaporated to dryness. The residue was commingled with 60 milliliters of aqueous 28% ammonium hydroxide solution and heated for 3 hours at 250° C. in a pressure vessel. The unreacted ammonia was removed from the ammoniation product, and the residue was refluxed with 90 milliliters of 20% hydrochloric acid to hydrolyze the glutamic acid precursor compounds therein. The hydrochloric acid was removed, and the residue was dissolved in water to a total volume of 100 milliliters. The resulting solution was analyzed and found to contain 4.42 grams of glutamic acid, corresponding to a 60.1% yield, based on acrolein dimer.

The foregoing examples refer to a number of specific details for the purpose of illustrating the invention, but with no intent to limit the invention thereto. Numerous modifications and equivalents of the invention will be readily apparent from the foregoing description to those skilled in the art.

The following claims particularly point out and distinctly claim the subject matter of the invention:

1. An improved method for oxidizing acrolein dimer to 3,4-dihydro-1,2-pyran-2-carboxylic acid, which comprises subjecting acrolein dimer to contact in an aqueous medium with molecular oxygen and a catalyst comprising a catalytic proportion of silver oxide in admixture with a base metal oxide, while maintaining the pH of the aqueous medium above 7.

2. An improved method for oxidizing acrolein dimer to 3,4-dihydro-1,2-pyran-2-carboxylic acid, which comprises subjecting acrolein dimer to treatment in an aqueous medium with molecular oxygen in finely divided form and a catalyst comprising a catalytic proportion of silver oxide supported on ferric oxide, while maintaining the pH of the aqueous medium above 7.

3. An improved method for oxidizing acrolein dimer to 3,4-dihydro-1,2-pyran-2-carboxylic acid, which comprises contacting acrolein dimer in an aqueous medium with moleecular oxygen in finely dispersed form and a catalyst comprising between about 1 and about 15% by weight of silver oxide supported on ferric oxide, while adding an alkaline material to the medium to maintain the pH thereof between 7 and about 9.

4. An improved method for oxidizing acrolein dimer to 3,4-dihydro-1,2-pyran-2-carboxylic acid, which comprises slurrying a catalyst comprising a catalytic proportion of silver oxide supported on ferric oxide in water, and adding acrolein dimer thereto while passing air in finely divided form through the reaction medium and while adding aqueous base thereto at a rate sufficient to maintain the pH thereof between 7 and about 9.

5. An improved method for oxidizing acrolein dimer to 3,4-dihydro-1,2-pyran-2-carboxylic acid, which comprises preparing an aqueous slurry containing between about 0.5 and about 5% by weight of a catalyst comprising essentially ferric oxide with about 1 to about 5% by weight of silver oxide, and passing air therethrough while adding acrolein dimer in a proportion between about 3 and about 5% by weight of the reaction medium and while adding aqueous alkali-metal hydroxide solution at a rate sufficient to maintain the pH thereof between 7 and about 9.

References Cited in the file of this patent

UNITED STATES PATENTS

| | | |
|---|---|---|
| 2,514,156 | Geyer et al. | July 4, 1950 |
| 2,562,848 | Whetstone | July 31, 1951 |
| 2,930,801 | Montagna et al. | Mar. 29, 1960 |

OTHER REFERENCES

Rideal et al.: "Catalysis in Teory and Practice," pages 119–124, Macmillian and Company (1926), London.

Rushton et al.: "Advances in Catalysis," volume III, page 112 (1951).